United States Patent
Mead (10) Patent No.: US 10,107,985 B2
(45) Date of Patent: Oct. 23, 2018

(54) OPTICAL FIBER CASSETTE WITH BEND LIMITING AND CONNECTOR SHIELD

(71) Applicant: Craig Mead, Fayetteville, NY (US)

(72) Inventor: Craig Mead, Fayetteville, NY (US)

(73) Assignee: FiberOne LLC, East Syracuse, NY (US)

( * ) Notice: Subject to any disclaimer, the term of this patent is extended or adjusted under 35 U.S.C. 154(b) by 0 days.

(21) Appl. No.: 15/635,712

(22) Filed: Jun. 28, 2017

(65) Prior Publication Data

US 2017/0299836 A1   Oct. 19, 2017

Related U.S. Application Data (62) Division of application No. 14/989,368, filed on Jan. 6, 2016, now Pat. No. 9,720,199.

(51) Int. Cl.
   *G02B 6/44* (2006.01)
   *G02B 6/38* (2006.01)

(52) U.S. Cl.
   CPC ......... *G02B 6/4478* (2013.01); *G02B 6/3897* (2013.01); *G02B 6/445* (2013.01); *G02B 6/4455* (2013.01)

(58) Field of Classification Search
   CPC .... G02B 6/4478; G02B 6/3897; G02B 6/445; G02B 6/4455
   See application file for complete search history.

(56) References Cited

U.S. PATENT DOCUMENTS

| | | | | | |
|---|---|---|---|---|---|
| 5,071,211 | A | * | 12/1991 | Debortoli | G02B 6/4452 174/50 |
| 5,946,440 | A | * | 8/1999 | Puetz | G02B 6/4455 385/135 |
| 7,340,145 | B2 | * | 3/2008 | Allen | G02B 6/4454 385/135 |
| 2006/0275008 | A1 | * | 12/2006 | Xin | G02B 6/4452 385/135 |
| 2007/0104447 | A1 | * | 5/2007 | Allen | G02B 6/4454 385/135 |
| 2011/0052133 | A1 | * | 3/2011 | Simmons | G02B 6/4455 385/135 |
| 2014/0079365 | A1 | * | 3/2014 | Hill | G02B 6/4455 385/135 |

* cited by examiner

*Primary Examiner* — Peter Radkowski
(74) *Attorney, Agent, or Firm* — Bernhard P. Molldrem, Jr.

(57) ABSTRACT

An optical fiber cassette is designed as an interface between a multi-fiber network cable and a number of patch fibers or jumpers. A base or main body includes a splice tray containing a splice holder and a radius limiter on which slack of pigtail fibers are coiled. A fan-out of the pigtail fibers terminate at an array of fiber connectors. A swing-up lid or cover plate provides access to the splice tray. The cover plate includes an inner radius limiter on or in which a plurality of slack coils are disposed, and an outer radius limiter that surrounds the inner radius limiter. The radius limiter arrangement protects the network cable from bending or kinking when the cassette is pulled or slid out and when it is pushed or slid back in. A U-guard connector cover removably fits onto the front of the cassette over plug-in connectors and jumper fibers.

6 Claims, 8 Drawing Sheets

OPTICAL FIBER CASSETTE WITH BEND LIMITING AND CONNECTOR SHIELD

This is a Division of co-pending application Ser. No. 14/989,368, filed Jan. 6, 2016, which is incorporated herein by reference.

FIELD OF THE INVENTION

This invention relates to fiber optic communications equipment and is more particularly concerned with splice boxes or cassettes that are employed in terminating multi-fiber network cables or trunk cables, and splitting them out to patch cables, patch cords or patch fibers, e.g., jumpers that plug into connectors on the splice box or cassette.

BACKGROUND OF THE INVENTION

A number of fiber optic cassettes have been proposed and employed in the communications field. These are typically compact, flat boxes, often of a tough transparent polymer, with a cassette housing portion that receives the network fiber cable, a splice tray on which the network fibers are spliced to connector pigtail fibers or similar fiber harness, with a pre-terminated fan-out of the pigtail fibers to optical connector jacks that are situated on a connector panel at the front of the cassette. Typically, a splice holder is provided in the splice tray to hold the splices in place, and there are members within the cassette for retaining multiple loops of the fibers and cables as pigtail slack and cable slack.

These cassettes are designed to be mounted in a rack or frame or enclosure. Where there are multiple cassettes employed in a given rack or frame, some provision must be made to let the technician pull the cassette out—either by sliding it out or by snapping it out of the rack—for servicing a cable or the individual jumpers that are plugged into the connector jacks.

In all cases, the optical fibers should be kept from bending beyond a predetermined minimum bend radius to avoid reflections and signal loss, as well as to prevent harmful mechanical strains on the fibers.

In prior splice boxes and cassettes, little to no thought was given to the network cable or trunk cable to prevent that cable from bending beyond the minimum radius any time the cassette is slid out or any time it is slid back in.

Also, no steps have been taken to physically protect the fibers and connectors of the jumpers and plug connectors that are plugged into the cassette, or especially to protect the jumpers and connectors of a given cassette when a technician is working on another cassette in the same rack or frame.

OBJECTS AND SUMMARY OF THE INVENTION

Accordingly, it is an object of this invention to provide a splice box or cassette for a fiber optic communications system that terminates a network cable or trunk cable and connects its fibers via pre-terminated and pre-tested fan-out fibers to respective fiber optic connectors on the unit's connector panel, which splice box or cassette incorporates features to protect the network cable and the jumper connectors during installation, maintenance, or repairs, and which avoids the drawbacks of the prior art.

It is another object to provide a cassette that is fully-populated with pre-terminated break-out or fan-out fibers and with radius-limiting structure on which the outside or network fiber cable can be coiled as slack, and in which the network fibers and fan-out fibers can be spliced, e.g., with fusion splices.

It is a related object that the cassette be provided with radius limiters that protect the network cable from bending within a given radius limit both when the cassette is slid out from the frame or rack for service, and when the cassette is slid back in place in the frame or rack.

It is another object to provide removable protective covers for the connectors and jumper fibers that plug into the cassette so that they are not disturbed in normal operations or when a different cassette in the rack is pulled out for service or maintenance, but which can be easily removed when service to a given cassette is needed.

In accordance with an aspect of the present invention, an optical fiber cassette is designed for use as an interface between a multi-fiber network cable and a number of patch fibers or jumpers that terminate in respective optical fiber plug connectors.

A base or main body of the cassette has a flat panel e.g., floor that defines a splice tray. In addition to a splice holder, the splice tray includes a radius limiter on which slack of fan-out fibers of a connector pigtail assembly are coiled. An adapter plate is situated at a proximal (front) end of the base and here are mounted an array of connectors to which respective ones of the fan-out fibers or pigtail fibers are terminated. On one or both side walls of the base there may be a slide member that holds the cassette in a frame or rack, and allows the cassette to be pulled out proximately (out of the frame or rack) for access to the connectors and to the splice tray, and also allows the cassette to be pushed in distally for normal operations.

A cover plate is held in place on the base above the splice tray and can be lifted out for access to the splice tray. The cover plate includes an inner radius limiter on which a plurality of slack coils of a multi-fiber network cable are disposed, and an outer radius limiter surrounding the inner radius limiter. The network cable is sheathed in this space where it is follows a loop in the space, but is stripped of the sheath after the loop to provide individual optical fibers. The network fiber cable is thus situated in a generally annular space defined between the inner and outer radius limiters. The individual fiber slack coils may be located here or within the inner radius limiter. In this way, the cassette is configured so as to prevent the network cable from being bent within its predetermined minimum bend radius when the cassette is pulled out (i.e., proximally) and also when the cassette is pushed back (distally) into the frame.

Favorably, the cover plate is of a swing-up design, and includes a hinge or pivot member disposed at a back or distal end that mates with a pivot member at a distal end of the base. This permits the cover plate to swing upward for access to the splice tray and to the pigtail or fan-out fibers.

In a preferred embodiment, the inner and outer radius limiters for the network or trunk cable are positioned on the under surface of the cover plate so as to be positioned beneath the cover plate and above the splice tray when the cover plate is closed. The adapter plate can be removably supported on the base and may be configured to be lifted out for access to the fan-out fibers and back sides of the array of connectors.

According to another aspect of this invention, each optical fiber cassette also includes a U-guard connector cover that is removably attached onto the cassette, i.e the adapter plate, base and/or cover, at the proximal or front side to cover the adapter plate. The U-guard is generally U-shaped in cross section as viewed from the side, and has a top wall and a bottom wall both extending proximally to a bent wall that connects the top and bottom walls at the front or proximal end. The U-guard also has open sides to permit the jumper fibers to exit to one side or the other, as fits the system design. The U-guard connector cover is favorably formed of a transparent polymer which is rigid but sufficiently flexible to permit installation and removal of the U-guard connector cover onto and from said cassette. The U-guard connector cover is elongated in a proximal-distal direction relative to its vertical height. In some embodiments there may be a tab on one or both sides of the U-guard connector cover, with the tab extending upward from the bottom wall and leaving a space between the top of the tab and the top wall to allow for passage of jumper fibers. Also the U-guard connector cover can have semi-circular recesses formed on the left and right sides of the front or bent wall. The retainer structure that holds the U-guard in place on the cassette can be formed on an under side of the top wall at or near its distal end, to mate with engaging structure on the cassette, but configured to permit removal of the U-guard connector cover from the cassette.

Alternatives and variations of this fiber optic cassette are also possible, following the main principles of this invention. The main aspects of the invention will become apparent from the ensuing description of a preferred embodiment, given in connection with the accompanying Drawing figures.

DETAILED DESCRIPTION OF THE PREFERRED EMBODIMENT

Figure 1:
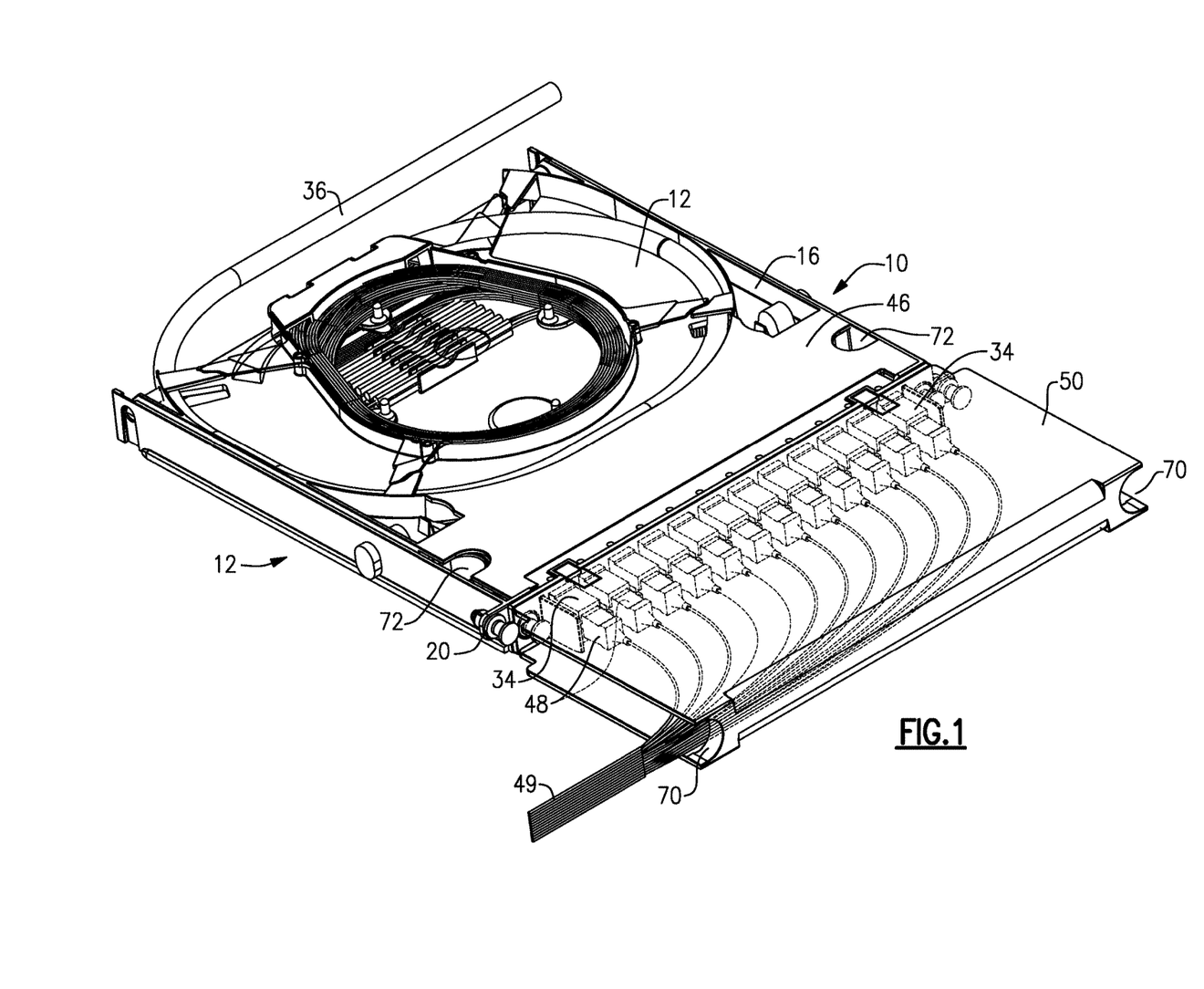
FIG. 1 is a perspective view of a pull-out or slide-out optical fiber cassette that embodies this invention.
Figure 2:
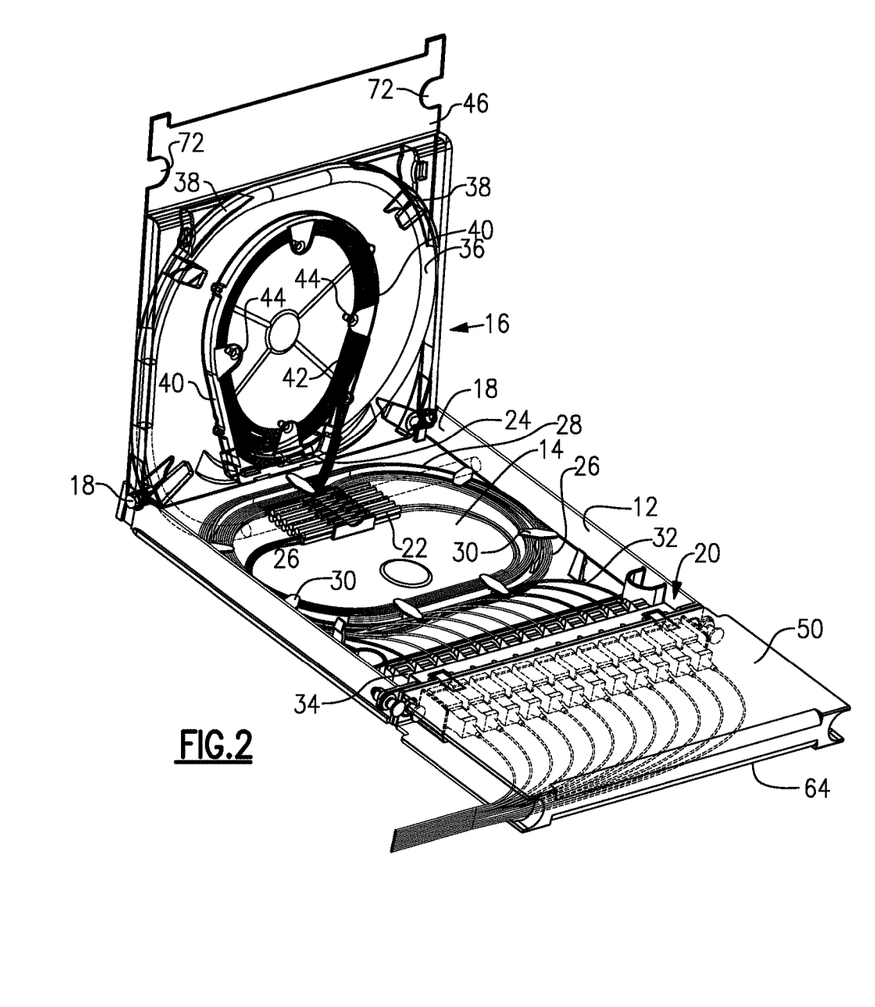
FIG. 2 is a perspective view of the fiber optic cassette of this embodiment, here shown with the lid or cover lifted upwards to show the network cable slack and splice tray with pigtail fiber slack with associated radius limiter(s), and with a removable U-guard in place over an array of plug-in jumper fibers.
Figure 3:
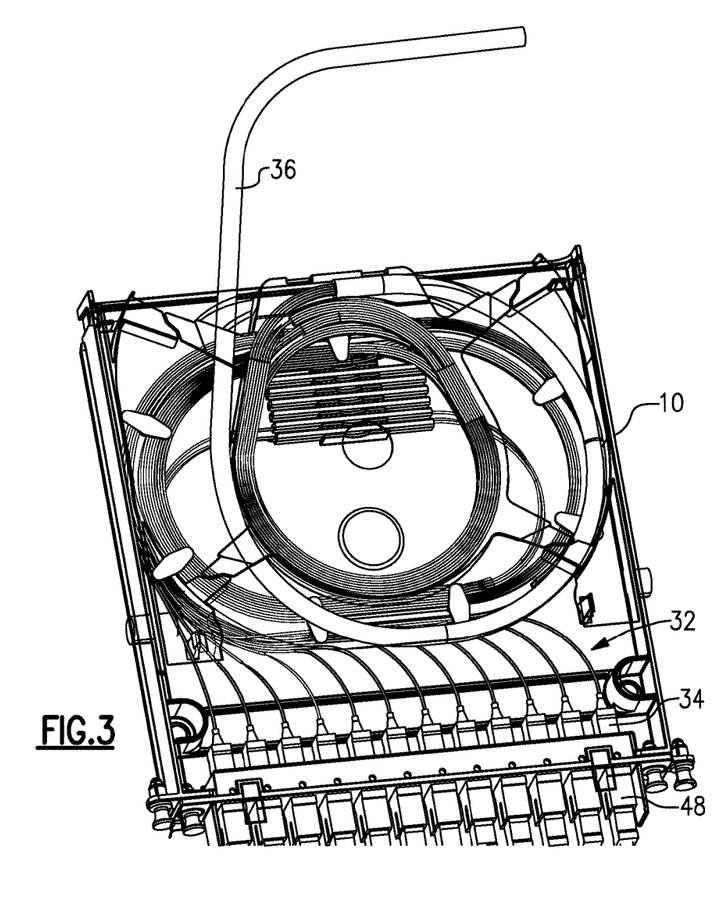
FIG. 3 is a another view illustrating action of the network cable when the cassette is slid to a forward position.

Referring now to FIGS. 1, 2, and 3, a fiber optic cassette 10 is illustrated, with the latter being formed of a tough clear or colored transparent plastic resin, generally of square or rectangular shape with a base 12 having a floor panel serving as a splice tray 14, and with a cover or lid 16 that here is connected by a pivot 18 with the rear or distal end of side walls of the base 12, so that the cover 16 can be lifted or swung up to an open position (FIG. 2) to access cables and fibers in the cassette. At a front wall of the cassette base 12 is an adapter plate 20 on which are mounted an array of fiber optic connectors, as will be discussed below.

As shown in FIG. 2, a splice block 22 or splice holder that is formed on the splice tray 14 supports splices that terminate network fibers 24 where they are spliced to pigtail fibers 26 that lead to plug-in connectors and jumpers going to customer fibers. Here, a raceway 28 holds loops of slack of the network fibers 24 and of pigtail fibers 26, and which serves as a radius limiter to ensure the slack loops do not bend to within a critical bend radius for the fibers. An array of tabs 30 are positioned to hold the slack of the network fibers 24 and pigtail fibers 26 in place. The array of pigtail fibers includes a fan-out 32 leading to the adapter plate 20 where the individual fibers terminate at respective female fiber connectors 34, here appearing as a horizontal array or row of twelve connectors 34.

As shown here, a sheathed network cable 36 enters the cassette at an open rear portion of the cassette 10 between the splice tray 14 and the cover 16, and continues in a loop (here fully sheathed) within an outer raceway 38 on the lid, ensuring that the network cable loop does not bend to less than its critical radius. Within the cassette after the loop, with the sheath stripped away the individual fibers of the cable emerge from the cable 36 and a slack 42 of multiple loops of the network fibers 24 are held within an inner radius limiter 40 that is attached to an underside of the cover or lid 16. A number of tabs 44 hold the slack 42 in place within the radius limiter 40 as shown. At an inside loop of the slack 42 the network fibers emerge and pass to the raceway oval 28 on the splice tray 14. The geometry of this is also arranged so that when the lid or cover is lifted, the network fibers 24 do not bend to within the critical radius of the fibers. A forward or proximal end of the cover 16 serves as a connector cover 46 over the fan-out 32 and the rear or fiber side of the connectors 34 to permit access to the connectors, if need be. Male fiber connectors 48 plug in to associated ones of the array of female connectors 34 on the adapter plate, and individual jumper fibers or patch fibers 49 emerge from these connectors 48. Finally, as shown in these views, a push-on, pull-off U-guard fiber connector cover 50 is shown in place at the front or proximal side of the cassette to cover and protect the associated patch or jumper fibers 49. The construction and features of the U-guard cover will be discussed shortly.

Figure 4:
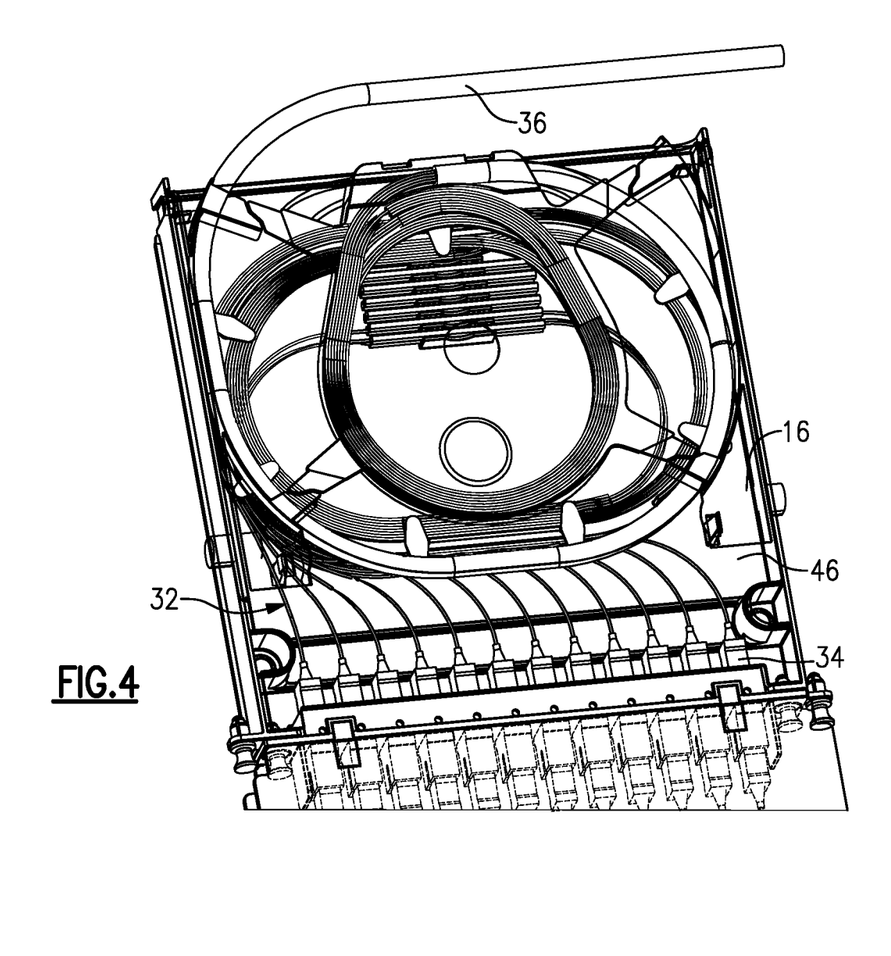
FIG. 4 is a view of the cassette in the condition in which the pull-out cassette is pushed fully in to the rack.

FIGS. 3 and 4 show the cassette in the conditions when it is slid out from its rack or frame, and when it is fully pushed in, respectively. The network cable 36 in the rack behind the cassette 10 does enjoy at least a limited amount of play. When the cassette 10 is in the pulled-out or withdrawn position (FIG. 3) the network cable 36 is allowed to pull out from the associated outer raceway 38, but is restrained from over-bending by the inner radius protector 40. These members hold the network cable in position so that when the cassette 10 is pushed back in to its normal operations position, the network cable 26 moves back into its position within the outer raceway 38. These features ensure that when the cassette is pulled out for technical service and also when it is returned to the pushed-in position, the network cable is never flexed or bent beyond its critical minimum bend radius.

Figure 5:
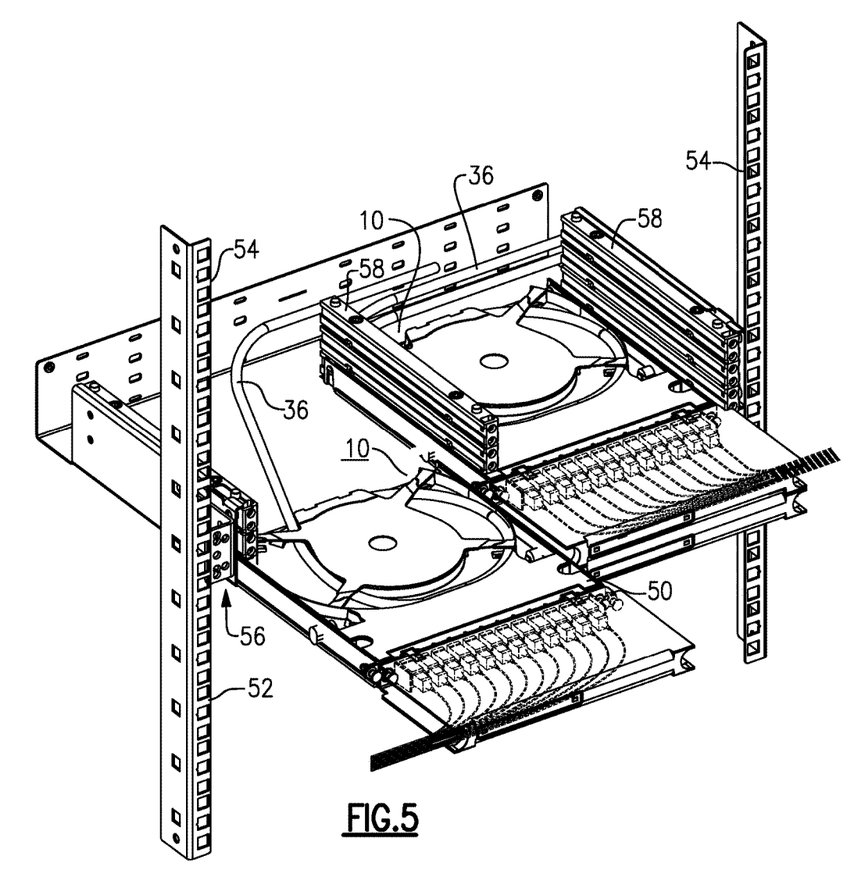
FIG. 5 is a perspective view of a rack or frame in which a pair of cassettes are supported.

In a typical installation, as shown in FIG. 5, the cassette or cassettes 10 are held in a frame or rack 52, here shown as two or more vertical rails 54 that support a tray or case 56 with slide fittings 58 that permit the cassettes 10 to slide to a withdrawn or service position (shown at the left) and a normal or returned position (shown at the right). Here the flexing action of the network cable (as discussed just above in connection with FIGS. 3 and 4) is shown for the left cassette and the right cassette, respectively.

Figure 6:
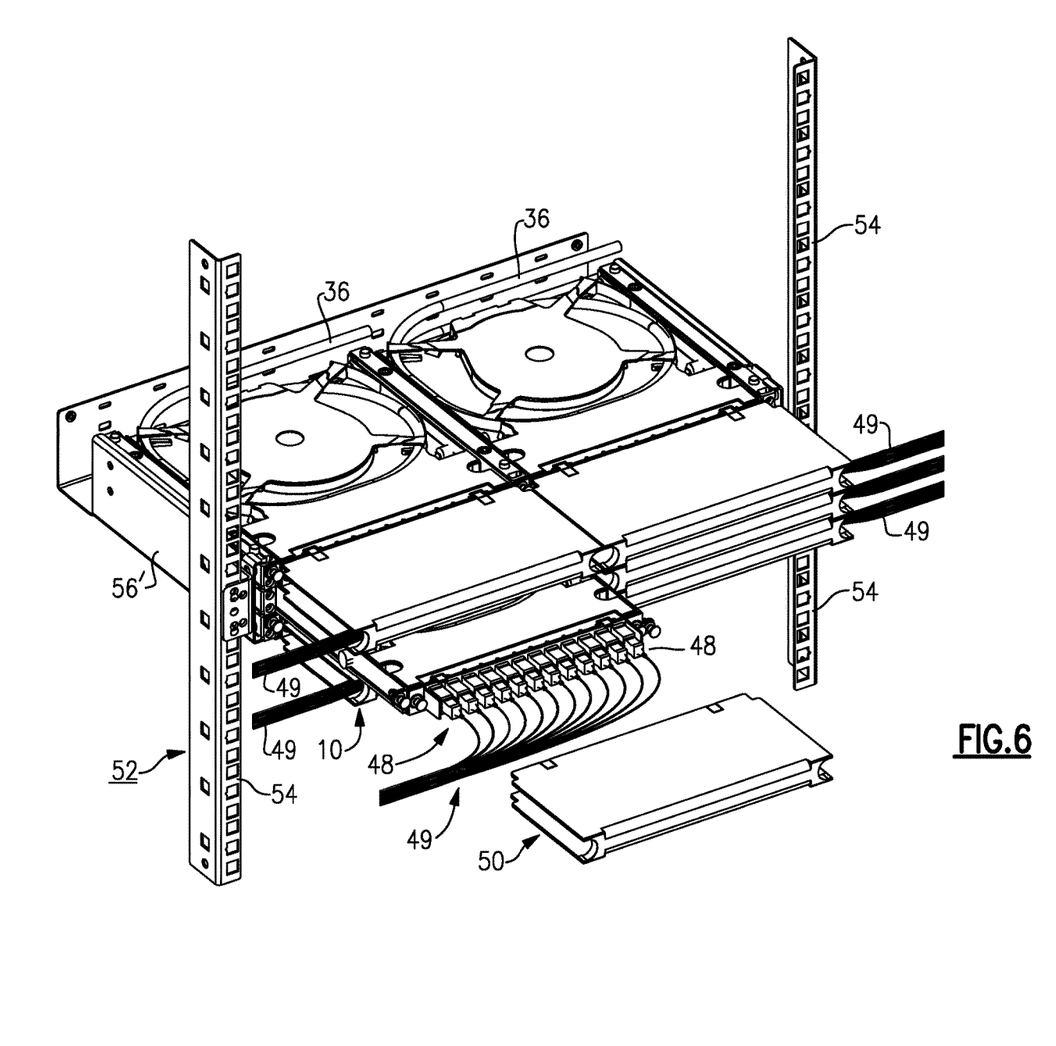
FIG. 6 is a view of a rack holding multiple cassettes, here with one of the cassettes slid forward for service with the associated U-guard cover removed for access to patch cord fibers or jumpers.

In many practical installations, e.g., as shown in FIG. 6, the rack or frame 52 will have a greater array of multiple cassettes, e.g., with the vertical rails 54 supporting one or more larger trays or cases 56', here shown with six cassettes, arranged in three rows of two cassettes. There is a need to ensure that the jumper fibers 49 remain properly organized for purpose of identification and service, and that when a technician may need to access one given cassette and its associated jumpers and connectors, that the remaining cassettes in the rack, as well as their associated connectors and jumper fibers, are protected from accidental damage. Those functions are served here by the U-guard covers 50 for the associated fiber cassettes 10. The details of the U-guard connector cover are explained in reference to FIGS. 7 and 8.

Figure 7:
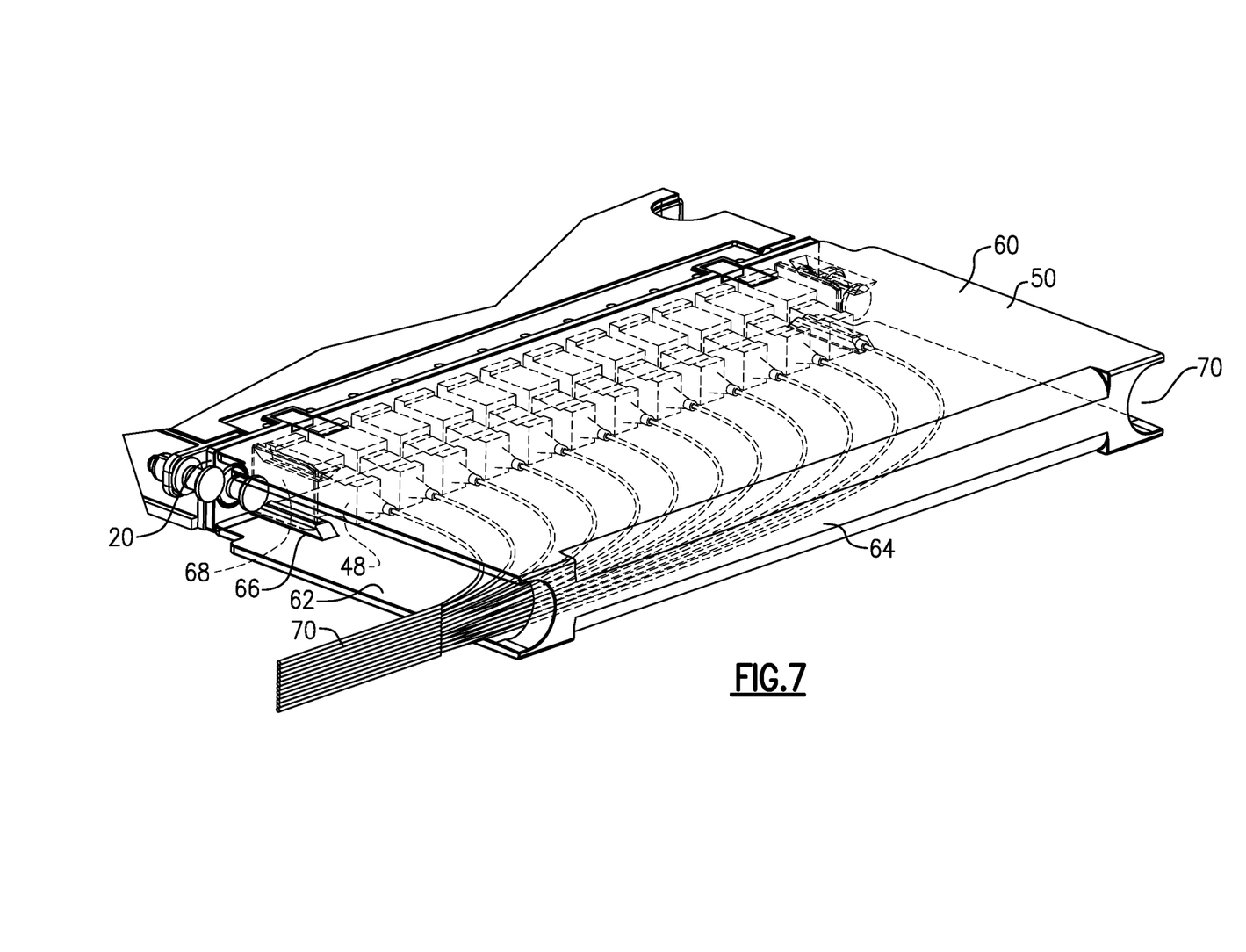
FIG. 7 is an enlarged view featuring the jumper fibers and connector array and the U-guard cover positioned over the jumper connector plugs.
Figure 8:
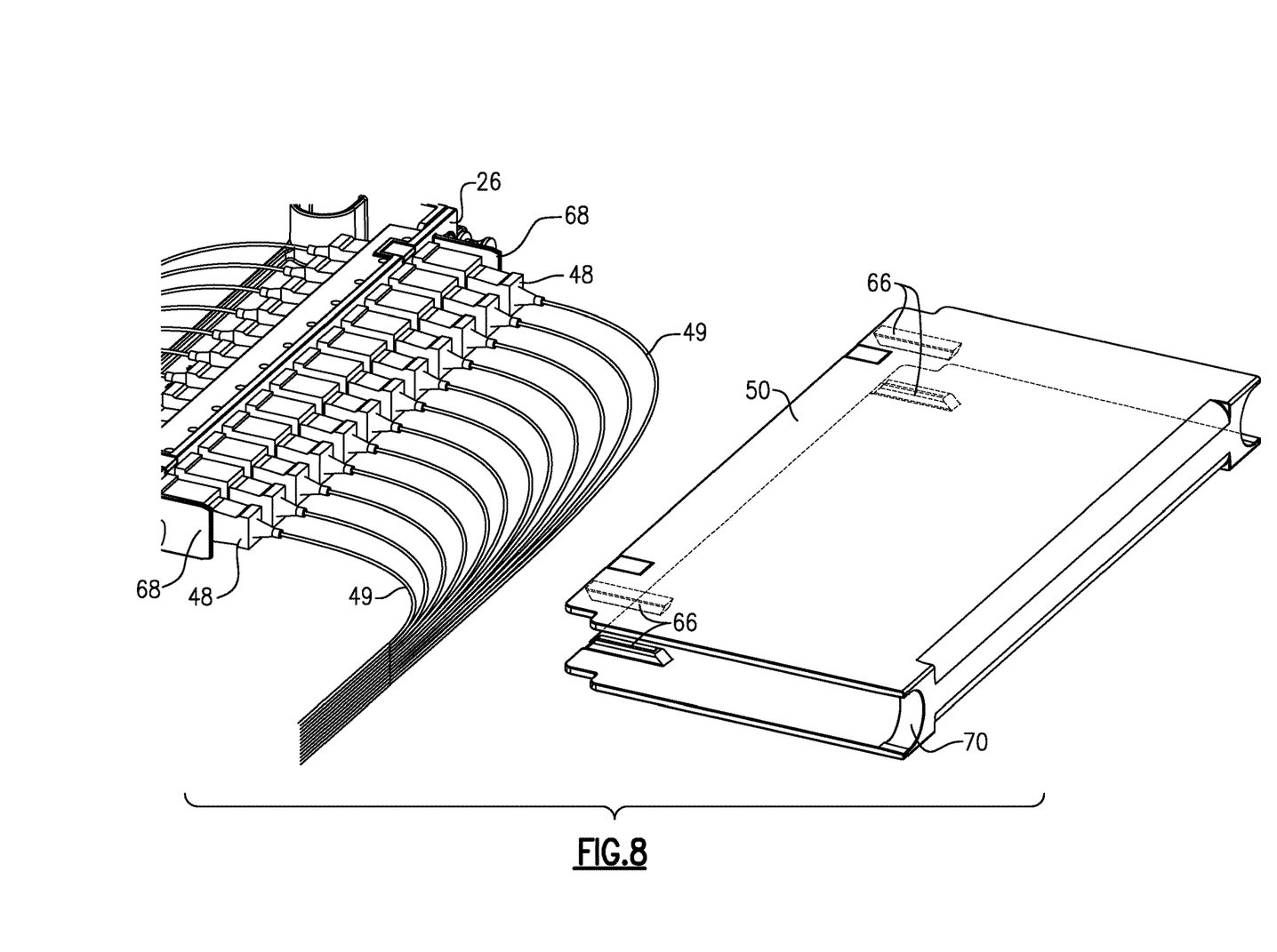
FIG. 8 is an enlarged view showing the U-guard cover removed for access to the connectors.

The U-guard connector cover 50 is a generally flat member having a horizontal profile that is more-or-less U-shaped, with an upper wall 60 and a lower wall 62 that project proximally or forward from the adapter plate 20 of the cassette 10 and are spaced apart about the same distance as the thickness of the cassette 10. A front wall 64 extends vertically for approximately the height of the cassette 10 and extends side-to-side a distance sufficient to cover the array of connectors 34 and 48. The front wall 64 joins the proximal ends of the upper and lower walls 60 and 62. Snap-on or slide-on retainers 66 are positioned on the underside of the upper wall 60 and at the upper side of the lower wall 62 at the distal side of the U-guard connector cover 50, and these are each disposed outside the row or array of connectors. These retainers 66 mate with corresponding retaining structure 68 that projects from the left and right sides of the adapter plate 20. In this embodiment there are semi-circular cutouts 70 at the left and right sides of the front wall 64 of the U-guard connector cover, which can serve as finger holes for gripping the U-guard to pull it free from the associated cassette, and which create a shape that avoids any sharp bends for the jumper fibers 49 where they exit the U-guard connector cover 50.

As seen in FIGS. 5 and 6, the U-guard connector covers 50 are open at both sides, and permit the bundles of jumper or patch fibers 49 to exit out of them either to the right or to the left.

When one of the cassettes is slid forward for service, e.g., as shown in FIG. 6, the U-guard cover 50 for that cassette can be slid off for access to the respective jumper connectors 48. The U-guard covers 50 for the other cassettes in the rack or frame remain in place and protect the jumpers and connectors for those cassettes from being disturbed while the one cassette is being serviced.

In this embodiment, the cassette base 12 and cover or lid 16 are formed of a transparent plastic material so the fibers and cables within can be viewed without first opening the lid. In other embodiments some portions of the cassette can be translucent or opaque, or formed of other materials. The U-guard cover 50 may be clear transparent plastic also, or may be smokey or colored transparent plastic. Also in this embodiment there are semi-circular cut-outs 72 at the sides of the connector cover 46, i.e., at the portion of the cover or lid 16 over the fan-out 32, to assist in gripping the lid to lift it open.

The foregoing description and drawings present an illustrative embodiment or embodiments of this invention and variations thereof for the purpose of explaining the invention. However, the invention is not limited to the disclosed embodiments, but rather extends to many modifications and variations thereof would present themselves to persons skilled in the art without departing from the scope and spirit of the invention as defined in the appended Claims.

What is claimed is:

1. An optical fiber cassette adapted for use as an interface between a multi-fiber network cable and a plurality of patch fibers that terminate in respective optical fiber connectors, the cassette comprising:

a base having a flat panel that defines a splice tray, the splice tray including a radius limiter on which slack of fan-out fibers of a connector pigtail assembly are coiled; an adapter plate at a proximal end of said base on which are arranged an array of connectors to which respective ones of said fan-out fibers are terminated, and at least one slide member arranged on a side wall of said base to permit the cassette to be mounted in a frame on slide fittings thereof and to be slidably pulled out proximately to an access position for access to said connectors and said splice tray without removing the cassette from the frame, and to be slidably pushed in distally to a normal position thereof for normal operations;

a cover plate held movably on said base above said splice tray, and including an inner radius limiter on which a plurality of slack coils of a multi-fiber network cable are disposed, and an outer radius limiter surrounding said inner radius limiter, the outer radius limiter and the inner radius limiter defining between them an annular raceway having an annular spacing; the cassette being configured such that a loop of a sheathed portion of the multi-fiber network cable having the fibers thereof within an outer sheath enters from said frame into a rear open portion of the cassette and is disposed in said annular raceway space defined between the inner and outer radius limiters, and the slack coils of said network cable fibers are situated in a generally annular space defined within said inner radius limiter, the cassette being configured wherein the annular raceway annular spacing is sufficiently greater than the width of the sheathed portion of said multi-fiber network cable, such that when said cassette is pushed in along said slide fittings to its normal position within the frame, said loop of said multi-fiber network cable lies against said outer radius limiter, and when said cassette is slid out along said slide fittings to its position for access to said connectors and said splice tray, said loop moves to lie against said inner radius limiter so as thereby to prevent the sheathed portion of the network cable from being bent within a predetermined minimum bend radius when said cassette is pulled out proximally and also when the cassette is pushed distally into said frame.

2. An optical fiber cassette according to claim 1 wherein said cover plate includes a hinge member disposed at a distal end thereof that mates with a pivot member at a distal end of the base, such that said cover plate is adapted to swing upward for access to said splice tray so as to define said rear open portion at said distal end through which the multi-network cable enters said cassette.

3. An optical fiber cassette according to claim 2 wherein said inner and outer radius limiters are positioned on an under surface of said cover plate so as to be positioned beneath the cover plate and above the splice tray when said cover is closed.

4. An optical fiber cassette according to claim 2 wherein said adapter plate is removably supported on said base and is configured to be lifted out for access to said fan-out fibers and back sides of the array of connectors.

5. The optical fiber cassette according to claim 1 wherein said base and said cover plate are each formed of a tough clear or colored transparent resin.

6. The optical fiber cassette according to claim 1 wherein said slack coils of the said multi-fiber network cable comprise a plurality of loops of individual fibers of said network cable disposed within said inner radius limiter.

* * * * *